United States Patent [19]

Sugiyama et al.

[11] 4,365,998
[45] Dec. 28, 1982

[54] AQUEOUS INKS FOR INK JET PRINTING

[75] Inventors: Masatoshi Sugiyama; Hideo Odawara; Nagao Takeda, all of Minami-ashigara, Japan

[73] Assignee: Fuji Photo Film Co., Ltd., Kanagawa, Japan

[21] Appl. No.: 255,134

[22] Filed: Apr. 17, 1981

[30] Foreign Application Priority Data

Apr. 21, 1980 [JP] Japan ................................. 55-52739

[51] Int. Cl.$^3$ ............................................. C09D 11/02
[52] U.S. Cl. ...................................................... 106/22
[58] Field of Search ........................................... 106/22

[56] References Cited

U.S. PATENT DOCUMENTS 3,705,043 12/1972 Zabiak .................................. 106/20
3,846,141 11/1974 Ostergren et al. .................... 106/20

FOREIGN PATENT DOCUMENTS 2103806 8/1971 Fed. Rep. of Germany .

OTHER PUBLICATIONS

Chem. Abstract, vol. 75, 1971, 135810h, Shinasu et al.
Chem. Abstract, vol. 68, 1968, 3110d, Frick, Jr. et al.

Frick, Jr. et al., Text. Res. J. 37(10), 894–897 (1967).

Primary Examiner—John Kight, III
Assistant Examiner—Amelia B. Yarbrough
Attorney, Agent, or Firm—Sughrue, Mion, Zinn, Macpeak & Seas

[57] ABSTRACT

An aqueous ink for ink jet printing, comprising water, from about 0.2 to 15 parts by weight of a water-soluble dye, and from about 1 to 50 parts by weight of a compound represented by Formula (I):

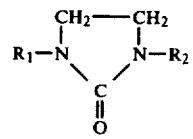

wherein $R_1$ and $R_2$ each independently represents a hydrogen atom, an alkyl group, a hydroxyalkyl group, or an alkoxyalkyl group. The ink is capable of producing clear dark characters and may be stored in an ink jet printer for relatively long periods of time with clogging in the nozzle of the printer.

7 Claims, No Drawings

AQUEOUS INKS FOR INK JET PRINTING

FIELD OF THE INVENTION

This invention relates to aqueous inks for ink jet printing and more particularly to improved aqueous inks for use in an ink jet printing process, which cause no blocking of a nozzle unit of an ink jet printing apparatus. In more detail, this invention is concerned with aqueous yellow, magenta, cyan and black inks which cause no blocking of a nozzle unit of an ink jet printing apparatus, are capable of providing printed images, such as letters and figures, having improved color characteristics, and thus which are suitable for use in the production of color images by an ink jet printing process.

BACKGROUND OF THE INVENTION

Typical ink jet printing processes which have heretofore been known include a process wherein ink is jetted as ink droplets through a fine nozzle. The nozzle typically has a diameter of several microns to several hundred microns. Each ink droplet is provided with a predetermined electrical charge according to an electric signal and then is subjected to electrostatic deflection by a high voltage deflection electrode. By controlling the deflections the ink forms letters, figures, etc. on the surface of a member to be printed, according to a predetermined dot matrix. According to another process ink is electrostatically withdrawn as ink droplets through a fine nozzle by the use of a high voltage electrode. Each droplet is accelerated and then subjected to electrostatic deflection with a deflection electrode, forming letters, figures, etc. on the surface of a member to be printed, according to a predetermined dot matrix. In still another process ink droplets are jetted in response to an electric signal, forming letters, figures, etc. on the surface of a member to be printed, according to a predetermined dot matrix.

Ink jet printing processes are basically grouped into two systems. In one system ink is jetted as ink droplets and charged, and the thus-charged ink droplet is electrostatically controlled, forming letters, figures, etc. on the surface of a member to be printed. In another system ink droplets are jetted through a fine nozzle in response to an electric signal, forming letters, figures, etc. on the surface of a member to be printed.

Aqueous inks useful in ink jet printing processes are comprised mainly of water and contain a hydrophilic organic solvent, a coloring dye and, if necessary, other various additives. These inks are useful for printing letters, figures and pictures on the surface of various members, such as plastics, metal, paper and cloth.

Aqueous inks must have the following characteristics:

(1) the ability to form uniform ink droplets when jetted through a fine nozzle:
  (a) a viscosity of from about 1 to 10 cps (20° C.);
  (b) a surface tension of about 20 dye/cm or more; and
  (c) a uniform quality containing no uneven particles.

(2) In order to form clear, sharp letters, figures, etc. on the surface of a member to be printed the ink must:
  (a) have good drying properties, i.e., be capable of being rapidly dried after ink jet printing, so that letters, figures, and pictures formed are not deformed;
  (b) have sufficient water-resistance such that letters, figures and pictures formed do not run even though contacted by water; and
  (c) be capable of strongly adhering onto the surface of a member to be printed.

(3) In order to obtain good colored images on the surface of a member to be printed the ink must:
  (a) contain a dye having a color required for the final colored image;
  (b) contain a dye having as much yellow, magenta or cyan as possible when using a subtractive color process, and have an absorption band in a desired range with the other regions of the absorption band reduced as much as possible;
  (c) be capable of producing a colored image sufficiently sharp and free from staining;
  (d) contain a dye which exhibits high saturation and density when printed on a member, such as paper, and furthermore when stored as ink or even after it is printed, does not change with respect to color intensity, i.e., it has high light-resistance and is not subject to changes in color;
  (e) contain a dye having a high solubility in water so as to provide an ink having a high color intensity;
  (f) contain a dye which does not excessively increase the viscosity of ink; and
  (g) contain a dye of low crystallinity so that when stored or allowed to stand as an ink, it does not cause blocking of a nozzle by the crystallization or solidification thereof.

It is known that a humectant is incorporated into ink in order to meet the foregoing requirements. In particular, this minimizes the undesirable drying properties of ink at a nozzle. Examples of such humectants known in the art include alkylene glycols and alkylene glycol alkyl ethers, wherein the alkylene group contains 2 to 6 carbon atoms and the alkyl group contains 1 to 6 carbon atoms, as described in U.S. Pat. Nos. 3,705,043 and 3,846,141; water-soluble organic solvents, such as formamide and dimethylformamide, as described in Japanese Patent Publication No. 6881/1978; N-hydroxyalkylformamides as described in Japanese patent application (OPI) No. 97620/1974 (the term "OPI" as used herein refers to a "published unexamined Japanese patent application"); and N-hydroxyalkyl-2-pyrrolidones as described in Japanese Patent Publication No. 16243/1979.

It is also known that for the purposes of obtaining high saturation and preventing aggregation and a change in color intensity of dye with a lapse of time, a solubilizing agent is added to ink in combination with a humectant. Such solubilizing agents include N-methyl-2-pyrrolidone, N-vinyl-2-pyrrolidone, substituted-pyrrolidones, 4-methoxy-4-methylpentanone-2, and tetrahydrofurfurylalcohol, which are described in U.S. Pat. No. 3,846,141.

The foregoing alkylene glycol-based solvent generally has a high viscosity and a low vapor pressure, and therefore it can prevent, to a certain extent, the drying or solidification of an aqueous ink when the jet flow of aqueous ink is stopped. However, under extreme conditions wherein the aqueous ink is jetted for a long period of time, interrupted for about one week, and again jetted, the dye or solids comprising the dye and ink additives precipitate in the nozzle. This causes blocking of the nozzle and inhibits smooth jetting of the ink. By increasing the amountof the alkylene glycol-based solvent added, the drying and solidification of the ink remaining in the vicinity of the nozzle can be improved to a certain extent, but cannot be substantially improved. An increase in this solvent leads to an increase in the viscosity of ink. Accordingly, the ink cannot flow through the nozzle at a sufficient velocity, resulting in the occurrence of a disarray of printed images.

The alkylene glycol alkyl ether-based solvent generally has a low surface tension. Therefore, when an ink droplet containing such an alkylene glycol alkyl ether-based solvent is attached onto the surface of a member to be printed, it is likely to run, and with members such as paper and cloth, it penetrates from the top surface to the back surface and runs on the surface, making the final image blurred. Furthermore, the alkylene glycol alkyl ether-based solvent is disadvantageous due to its low solubility in an aqueous dye, so that it cannot provide a sufficiently colored image. Furthermore, it increases the viscosity of ink.

The amide-based solvent is significantly hydrolyzed in ink, i.e., an aqueous solution, resulting in a decrease in the pH. Therefore, it cannot be used in those dyes which are greatly dependent on pH. This limits the range of water-soluble dyes which can be used. Because of its high corrosive action on metal and plastics, it is necessary to use a specific ink jet printing apparatus. The amide-based solvent is effective in preventing the blocking of the nozzle unit to a certain extent. However, this anti-clogging effect is not satisfactory. Furthermore, it fails to provide a color image having sufficient saturation and color density.

SUMMARY OF THE INVENTION

An object of this invention is to provide aqueous inks for use in an ink jet printing process.

Another object of this invention is to provide aqueous inks for use in an ink jet printing process, which is improved so that it causes no blocking of a nozzle.

A further object of this invention is to provide aqueous yellow, magenta, cyan and black inks for use in an ink jet printing process, which provide color images having sufficient saturation and color density, and which are not changed with respect to saturation and color density even when they are allowed to stand.

These objects can be attained by incorporating in the ink a compound represented by Formula (I):

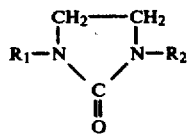

wherein $R_1$ and $R_2$ which may be the same or different, each represents a hydrogen atom, an alkyl group, a hydroxyalkyl group, or an alkoxyalkyl group.

This invention, therefore, provides an aqueous ink for use in an ink jet printing process, which comprises water, from about 0.2 to 15 parts by weight based on the weight of the whole of a water-soluble dye, and from about 1 to 50 parts by weight based on the weight of the whole of a compound represented by Formula (I) above.

DETAILED DESCRIPTION OF THE INVENTION

In Formula (I) of this invention, $R_1$ and $R_2$ may be the same or different and each represents a hydrogen atom, an alkyl group, a hydroxyalkyl group, or an alkoxyalkyl group.

Preferred examples of such alkyl groups which can be used are those containing therein 1 to 3 carbon atoms, such as a methyl group, an ethyl group, an n-propyl group and an isopropyl group.

Preferred examples of such hydroxyalkyl groups which can be used are those containing therein 1 to 2 carbon atoms, such as a hydroxymethyl group and a 2-hydroxyethyl group.

Preferred examples of such alkoxyalkyl groups which can be used are those containing 2 to 4 carbon atoms, such as a methoxymethyl group, an ethoxymethyl group, an isopropoxymethyl group, and a methoxyethyl group.

Where any of $R_1$ and $R_2$ is a hydrogen atom, it is preferred that the other is a group other than the hydrogen atom.

Of these, those of Formula (I) wherein $R_1$ and $R_2$ are an alkoxyalkyl group are preferred because they increase ab affinity of the dye used with water.

Suitable examples of the compounds represented by Formula (I) are shown below:

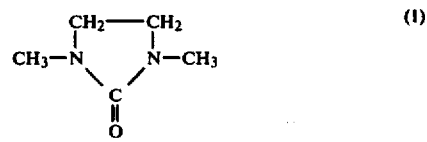

(1)

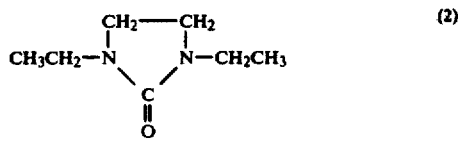

(2)

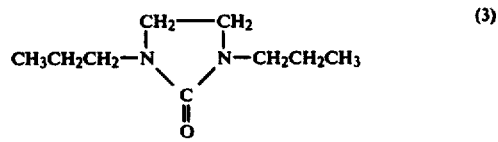

(3)

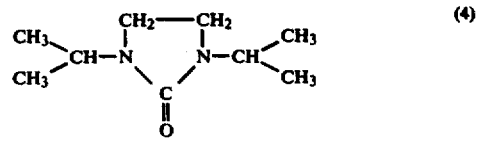

(4)

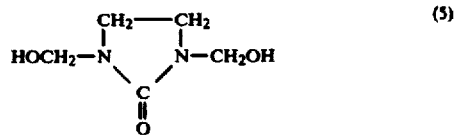

(5)

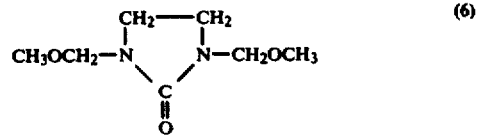

(6)

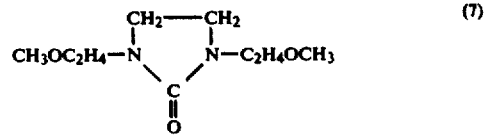

(7)

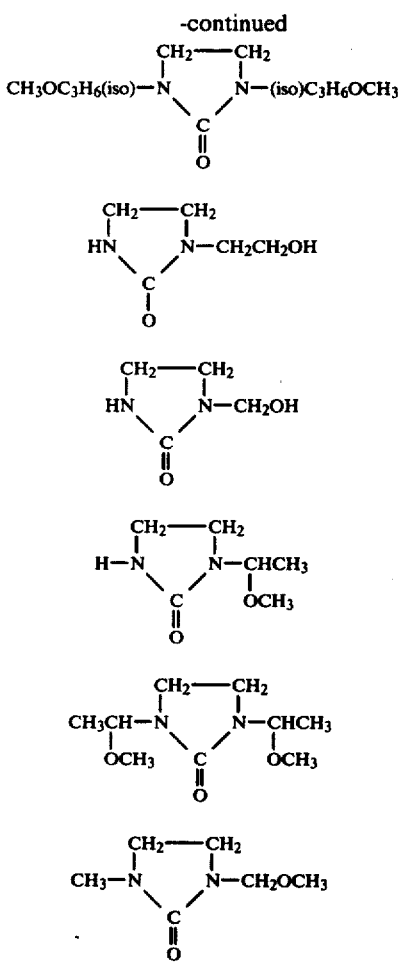

Methods of synthesizing the compounds represented by Formula (I) are well known in the art, and they can be prepared with reference to, for example, *The Journal of the Chemical Society*, 1947, 307 to 318, British Pat. Nos. 577,735 and 849,541, and U.S. Pat. No. 2,517,750, all of which are incorporated herein by reference.

Some of the compounds represented by Formula (I) are available on the market. For example, Compound (1), 1,3-dimethyl-2-imidazolidinone, is sold by BASF AG (West Germany) and Kawaken Fine Chemical Co., Ltd., and Compound (5), 1,3-dihydroxymethyl-2-imidazolidinone, is sold by Sumitomo Chemical Co., Ltd. under the trade name of Sumitex Resin 901.

Compound (I) is a high boiling point liquid organic compound which is miscible with water at any proportions. It has been confirmed that Compound (I) markedly increases the solubility of dye used in this invention in water and the saturation and color density on a member to be printed. Furthermore, it has great humecting effect, and therefore Compound (I) significantly inhibits the drying of ink at the nozzle.

While the compounds represented by Formula (I) are miscible with water at any proportions, the amount of the compound added is from about 1 to 50 parts by weight, preferably from about 1 to 30 parts by weight, and more preferably from about 3 to 25 parts by weight, based on the total weight of the ink composition. However, the amount varies depending on the type of the water-soluble dye used.

Since the compounds represented by Formula (I) have low viscosity and are subject to only a small change in surface tension, the viscosity of the inks prepared using such compounds can be maintained within the range of from about 1 to 5 cps (20° C.). Maintaining this viscosity range is necessary for ink jet printing, even though the amount of the compound added as the humectant or solubilizing agent is changed. Furthermore, the use of these compounds makes it possible to maintain surface tension at about 40 dye/cm or more. Thus, the compounds represented by Formula (I) are organic liquid solvents suitable for use in forming ink droplets having a uniform particle size at a high speed.

The compounds represented by Formula (I) exhibit significant effects as a humectant and a solubilizing agent. These effects are not deteriorated even though the foregoing alkylene glycols, alkylene glycol alkyl ethers, formamide, dimethylformamide, N-hydroxyalkylformamides, and N-hydroxyalkyl-2-pyrrolidones are added. Furthermore, even though N-methyl-2-pyrrolidone, N-vinyl-2-pyrrolidone, substituted pyrrolidones, and β,β'-dihydroxy sulfides are added, the effects are not deteriorated.

In accordance with this invention, the compound represented by Formula (I) is added to make it possible to continuously and stably jet ink droplets for long periods of time. Compounds of Formula (I) are humectants for preventing the drying and solidification of the dye and other compounds, which might clog the nozzle. Another cause for the blocking of the nozzle is believed to be the growth of mold and the formation of aggregation products resulting from the growth of mold. Thus, conventional aqueous inks contain an anti-mold agent.

Such molds or bacteria live everywhere in the ink jet printing apparatus. For example, they may be found in the ink path, store tank, or nozzle. Under conditions suitable for the growth with respect to nutrients, temperature, moisture, these organisms grow markedly well, forming a colony and aggregation products comprising the dye and other additives, resulting in blocking of the nozzle.

To prevent clogging of the nozzle resulting from the growth of mold and bacteria, various compounds have been incorporated into the aqueous inks. Examples of such compounds include dioxine(2,2-dimethyl-6-acetoxy-dioxine-1,3) as disclosed in U.S. Pat. No. 3,705,043; sodium omazine (2-pyridinethiol-1-oxide sodium salt) as disclosed in Japanese patent application (OPI) No. 95008/1975; 8-quinolylcitric acid as disclosed in Japanese patent application (OPI) No. 135707/1978; and sodium dehydroacetate, 1,2-benzisothiazaline-3-onamine salts, 2-(4-thiazolyl)-benzimidazole as disclosed in Japanese Patent Publication Nos. 16243/1979 and 16244/1979.

It is also necessary in this invention to prevent mold and bacteria from causing the blocking of the nozzle. Accordingly, the above mentioned compounds can be incorporated into the aqueous inks of this invention. In view of anti-mold characteristics and furthermore ink jet characteristics, sodium dehydroacetate is preferably used in this invention. The anti-mold agent can be added in an amount such that the anti-mold effect is maintained and ink jet characteristics are not deteriorated.

Water-soluble dyes which can be used in this invention include direct dyes, basic dyes, reactive dyes and acid dyes. The amount of the dye added to the ink composition is determined depending on the color intensity of the image ink-jetted on a member to be printed. The color intensity of the image is determined by the mutual action of the ink and the member to be printed. Accordingly, the amount of the dye to the ink composition is determined depending material upon which the printing is to be done. Therefore, in preparing yellow, magenta, cyan and black inks, it is desirable to use from about 0.2 to 15 parts by weight, preferably from about 0.5 to 7 parts by weight, based on the weight of the ink composition, of one or more water-soluble dyes.

Examples of direct dyes, basic dyes, reactive dyes and acid dyes which can be used are described in Japanese patent application (OPI) No. 89534/1974. Additionally, the following dyes can be used.

(I) Direct Dyes
  C.I. Direct Yellow 27 (C.I. 13950)
  C.I. Direct Yellow 28 (C.I. 19555)
  C.I. Direct Yellow 33 (C.I. 29020)
  C.I. Direct Yellow 39
  C.I. Direct Yellow 58
  C.I. Direct Yellow 86
  C.I. Direct Yellow 100
  C.I. Direct Red 63
  C.I. Direct Red 75 (C.I. 25380)
  C.I. Direct Red 79 (C.I. 29065)
  C.I. Direct Red 80 (C.I. 35780)
  C.I. Direct Red 83 (C.I. 29225)
  C.I. Direct Red 99
  C.I. Direct Red 220
  C.I. Direct Red 224
  C.I. Direct Violet 47 (C.I. 25410)
  C.I. Direct Violet 48 (C.I. 29125)
  C.I. Direct Violet 51 (C.I. 27905)
  C.I. Direct Violet 90
  C.I. Direct Violet 94
  C.I. Direct Blue 1 (C.I. 24410)
  C.I. Direct Blue 8
  C.I. Direct Blue 71 (C.I. 34140)
  C.I. Direct Blue 76 (C.I. 24411)
  C.I. Direct Blue 78 (C.I. 34200)
  C.I. Direct Blue 80
  C.I. Direct Blue 86 (C.I. 74180)
  C.I. Direct Blue 90
  C.I. Direct Blue 106 (C.I. 51300)
  C.I. Direct Blue 108 (C.I. 51320)
  C.I. Direct Blue 123 (C.I. 26705)
  C.I. Direct Blue 163 (C.I. 33560)
  C.I. Direct Blue 165
  C.I. Direct Black 19 (C.I. 35255)
  C.I. Direct Black 38 (C.I. 30235)
  C.I. Direct Black 71 (C.I. 25040)
  C.I. Direct Black 74 (C.I. 34180)
  C.I. Direct Black 75 (C.I. 35870)
  C.I. Direct Black 112
  C.I. Direct Black 117
(II) Acid Dyes
  C.I. Acid Yellow 17 (C.I. 18965)
  C.I. Acid Yellow 19
  C.I. Acid Yellow 25 (C.I. 18835)
  C.I. Acid Yellow 29 (C.I. 18900)
  C.I. Acid Yellow 38 (C.I. 25135)
  C.I. Acid Yellow 49
  C.I. Acid Yellow 59
  C.I. Acid Yellow 61
  C.I. Acid Yellow 72
  C.I. Acid Red 1 (C.I. 18050)
  C.I. Acid Red 8 (C.I. 14900)
  C.I. Acid Red 32 (C.I. 17065)
  C.I. Acid Red 37 (C.I. 17045)
  C.I. Acid Red 42 (C.I. 17070)
  C.I. Acid Red 57
  C.I. Acid Red 115 (C.I. 27200)
  C.I. Acid Red 119
  C.I. Acid Red 131
  C.I. Acid Red 133 (C.I. 17995)
  C.I. Acid Red 134 (C.I. 24810)
  C.I. Acid Red 154 (C.I. 24800)
  C.I. Acid Red 186 (C.I. 18810)
  C.I. Acid Red 249 (C.I. 18134)
  C.I. Acid Red 254
  C.I. Acid Red 256
  C.I. Acid Violet 11 (C.I. 17060)
  C.I. Acid Violet 34 (C.I. 61710, 61800)
  C.I. Acid Violet 26
  C.I. Acid Violet 75
  C.I. Acid Blue 29 (C.I. 20460)
  C.I. Acid Blue 126
  C.I. Acid Blue 171
  C.I. Acid Blue 175
  C.I. Acid Blue 183
  C.I. Acid Black 1 (C.I. 20470)
  C.I. Acid Black 24 (C.I. 26370)
  C.I. Acid Black 26 (C.I. 27070)
  C.I. Acid Black 48 (C.I. 65005)
  C.I. Acid Black 52 (C.I. 15711)
  C.I. Acid Black 58
  C.I. Acid Black 60
  C.I. Acid Black 107
  C.I. Acid Black 109
  C.I. Acid Black 119
  C.I. Acid Black 131
  C.I. Acid Black 155
(III) Reactive Dyes
  C.I. Reactive Blue 7
  C.I. Reactive Blue 14
  C.I. Reactive Blue 15
  C.I. Reactive Blue 18
  C.I. Reactive Blue 21
  C.I. Reactive Blue 25
  C.I. Reactive Yellow 1
  C.I. Reactive Yellow 2
  C.I. Reactive Yellow 3
  C.I. Reactive Yellow 13
  C.I. Reactive Yellow 14
  C.I. Reactive Yellow 15
  C.I. Reactive Yellow 17
  C.I. Reactive Red 2
  C.I. Reactive Red 6
  C.I. Reactive Red 11
  C.I. Reactive Red 23
  C.I. Reactive Red 36
  C.I. Reactive Violet 2
  C.I. Reactive Violet 4
  C.I. Reactive Violet 8
  C.I. Reactive Violet 9
(IV) Basic Dyes
  C.I. Basic Yellow 11
  C.I. Basic Yellow 14
  C.I. Basic Yellow 21
  C.I. Basic Yellow 32
  C.I. Basic Red 1
  C.I. Basic Red 2
  C.I. Basic Red 9
  C.I. Basic Red 12

C.I. Basic Red 13
C.I. Basic Violet 3
C.I. Basic Violet 7
C.I. Basic Violet 14
C.I. Basic Blue 3
C.I. Basic Blue 9
C.I. Basic Blue 24
C.I. Basic Blue 25

It is also possible to use chelate dyes, and azo dyes which are used in a light-sensitive medium for the so-called silver dye bleaching method (e.g., Ciba Chrom produced by Ciba Geigy Corp.).

These chelate dyes are described in, for example, British Pat. No. 1,077,484. Azo dyes for the silver dye bleaching method are described in, for example, British Pat. Nos. 1,039,458, 1,004,957, and 1,077,628, and U.S. Pat. No. 2,612,448.

The aqueous ink of this invention can contain, if necessary, inorganic compounds, such as sodium chloride and Glauber salt, chelating agents, such as EDTA, organic solvents, such as alkanolamines, and water-soluble polymers, such as hydroxyethyl cellulose, polystyrene sulfonic acid, and polyvinyl alcohol.

In order to improve the wetting ability of the aqueous ink, surfactants can be incorporated into the aqueous ink taking into consideration the mutual action between the aqueous ink and the surface of the material being printed. Since the foregoing water-soluble dyes are used in the aqueous ink of this invention, surfactants falling within the same liquid series as the dyes cannot be used. Thus, the wetting of the aqueous ink of this invention can be improved by adding different kinds of surfactants or liquid surfactants having no relation with the dyes. For example, for acid and direct dyes, cationic and nonionic surfactants can be used; for basic dyes, anionic and nonionic surfactants can be used; and for reactive dyes, nonionic surfactants can be used.

The amount of the surfactant used is determined within a range such that critical values with respect to viscosity and surface tension of the present aqueous ink can be maintained.

The use of a particular ink jet printer in connection with the aqueous ink of this invention is not critical. Any electric charge-controlling system as described in U.S. Pat. No. 3,298,030, a pressure pulse system as described in U.S. Pat. No. 3,747,120, etc. can be used.

Various types of papers may be used for printing with the aqueous ink of this invention by the ink jet printing process. In general, paper commonly used in an ink jet printing process is used. The use of so-called coat paper, prepared by coating a clay layer on paper, is particularly preferred.

These coat papers are described, for example, in U.S. patent application Ser. No. 144,115, filed Apr. 28, 1980 and GB No. 2050866A.

The following Examples are given to illustrate this invention in greater detail.

EXAMPLE 1

A yellow ink having the following formulation was prepared.

| | |
|---|---|
| C.I. Acid Yellow 17 (Erio Flaving 3G 180%, produced by Ciba Geigy) | 2.5 parts |
| Compound (1) | 20 parts |
| Thiodiglycol | 15 parts |
| Diethylene Glycol | 1.0 part |
| Diethylene Glycol Monoethyl Ether | 2.5 parts |
| Triethanolamine | 2.5 parts |
| Sodium Dehydroacetate | 0.2 part |
| Water | 56.3 parts |

The thus-obtained yellow ink had a viscosity of 2.2 cps (20° C.), a surface tension of 45.2 dye/cm (20° C.) and pH of 7.6, and when filtered under pressure (3 Kg/cm$^2$) by the use of a microfilter (0.8μ, 47 φ, Model FM, produced by Fuji Photo Film Co., Ltd.), it could be filtered in 30 seconds without blocking. Even after being allowed to stand in a refrigerator (4° C.) for one month, it could be filtered under pressure in 31 seconds by the same microfilter as used above. The forced testing in a cold place caused no change in the yellow ink.

In order to examine the state in which the yellow ink was dried at the top of a nozzle of an ink jet printer, testing was performed using an ink jet printer, Jet Point (produced by Sharp Co., Ltd.). Even after being allowed to stand for 20 days in a room the ink could be used for printing. This indicates that even if the yellow ink is used intermittently, no blocking of the nozzle will not occur.

EXAMPLE 2

An ink having the following formulation was prepared.

| | |
|---|---|
| C.I. Basic Red 12 (Aizen Astra Phloxine FF conc., produced by Hodogaya Chemical Co., Ltd.) | 0.5 part |
| Compound (2) | 20 parts |
| N—(2'-Hydroxyethyl)lactoamide | 5 parts |
| Sodium Dehydroacetate | 0.2 part |
| Water | 74.3 parts |

The thus-obtained ink had a viscosity of 1.90 cps (20° C.), a surface tension of 48.5 dye/cm (20° C.), and pH of 8.5 (20° C.).

By filtering under pressure (3 Kg/cm$^2$) by the use of a microfilter (0.8μ, 47 φ, Model FM, produced by Fuji Photo Film Co., Ltd.), the ink could be filtered in 25 seconds. After being allowed to stand in a refrigerator (4° C.) for one month, it could be filtered in 27 seconds under the same conditions as above. In the test using the same ink jet printer as used in Example 1, printing could be carried out even after being allowed to stand for 25 days in a room.

EXAMPLE 3

An ink having the following formulation was prepared.

| | |
|---|---|
| C.I. Direct Blue 86 (Lionol Blue GS, produced by Toyo Ink Co., Ltd.) | 2.4 parts |
| Compound (6) | 10 parts |
| N—(2'-Hydroxyethyl)lactoamide | 5 parts |
| Diethylene Glycol Monobutyl Ether | 0.5 part |
| Sodium Dehydroacetate | 0.2 part |
| Water | 72.9 parts |

The thus-obtained ink had a viscosity of 2.07 cps (20° C.), a surface tension of 43.1 dye/cm (20° C.), and pH of 9.5.

By filtering under pressure (3 Kg/cm$^2$) by the use of a microfilter (0.8μ, 47 φ, Model FM, produced by Fuji Photo Film Co., Ltd.), the ink could be filtered in 40 seconds. After being allowed to stand in a refrigerator (4° C.) for one month, it could be filtered in 43 seconds under the same conditions as above. In the test using the same ink jet printer as used in Example 1, printing could be carried out even after being allowed to stand for 20 days in a room.

EXAMPLE 4

A yellow ink having the following formulation was prepared.

| | |
|---|---|
| C.I. Acid Yellow 19 | 3.5 parts |
| Compound (6) | 20 parts |
| Thiodiglycol | 15 parts |
| Diethylene Glycol | 1.0 part |
| Diethylene Glycol Monoethyl Ether | 2.5 parts |
| Triethanolamine | 2.5 parts |
| Sodium Dehydroacetate | 0.2 part |
| Water | 55.3 parts |

The thus-obtained yellow ink had a viscosity of 2.5 cps (20° C.), a surface tension of 44.6 dye/cm (20° C.) and pH of 8.9, and when filtered under pressure (3 Kg/cm$^2$) by the use of microfilter (0.8μ, 47 φ, Model FM, produced by Fuji Photo Film Co., Ltd.), it could be filtered in 34 seconds without blocking. Even after being allowed to stand in a refrigerator (4° C.) for one month, it could be filtered under pressure in 40 seconds by the same microfilter as used above. The forced testing in a cold place caused no change in the yellow ink.

In order to examine the state in which the yellow ink was dried at the top of a nozzle of an ink jet printer, testing was performed using an ink jet printer, Jet Point (produced by Sharp Co., Ltd.). Even after being allowed to stand for 20 days in a room the ink could be used for printing. This indicates that even if the yellow ink is used intermittently, no blocking of the nozzle will not occur.

EXAMPLE 5

An ink having the following formulation was prepared.

| | |
|---|---|
| C.I. Acid Violet 26 | 2.5 parts |
| Compound (6) | 20 parts |
| N—(2'-Hydroxyethyl)lactoamide | 5 parts |
| Sodium Dehydroacetate | 0.2 part |
| Water | 72.3 parts |

The thus-obtained ink had a viscosity of 2.20 cps (20° C.), a surface tension of 45.8 dye/cm (20° C.), and pH of 7.6 (20° C.).

By filtering under pressure (3 Kg/cm$^2$) by the use of a microfilter (0.8μ, 47 φ, Model FM, produced by Fuji Photo Film Co., Ltd.), the ink could be filtered in 26 seconds. After being allowed to stand in a refrigerator (4° C.) for one month, it could be filtered in 30 seconds under the same conditions as above. In the test using the same ink jet printer as used in Example 1, printing could be carried out even after being allowed to stand for 25 days in a room.

EXAMPLE 6

An ink having the following formulation was prepared.

| | |
|---|---|
| C.I. Direct Blue 86 (Lionol Blue GS, produced by Toyo Ink Co., Ltd.) | 2.4 parts |
| Compound (5) | 10 parts |
| N—(2'-Hydroxyethyl)lactoamide | 5 parts |
| Diethylene Glycol Monobutyl Ether | 0.5 part |
| Sodium Dehydroacetate | 0.2 part |
| Water | 72.9 parts |

The thus-obtained ink had a viscosity of 2.4 cps (20° C.), a surface tension of 45.2 dye/cm (20° C.), and pH of 9.3.

By filtering under pressure (3 Kg/cm$^2$) by the use of a microfilter (0.8μ, 47 φ, Model FM, produced by Fuji Photo Film Co., Ltd.), the ink could be filtered in 43 seconds. After being allowed to stand in a refrigerator (4° C.) for one month, it could be filtered in 47 seconds under the same conditions as above. In the test using the same ink jet printer as used in Example 1, printing could be carried out even after being allowed to stand for 20 days in a room.

While the invention has been described in detail and with reference to specific embodiments thereof, it will be apparent to one skilled in the art that various changes and modifications can be made therein without departing from the spirit and scope thereof.

What is claimed is:

1. An aqueous ink comprising:
water;
from about 0.2 to 15 parts by weight of a water-soluble dye; and
from about 1 to 50 parts by weight of a compound represented by Formula (I):

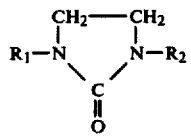

wherein R$_1$ and R$_2$ each independently represents a hydrogen atom, an alkyl group, a hydroxyalkyl group, or an alkoxyalkyl group.

2. An aqueous ink as claimed in claim 1, wherein R$_1$ is hydrogen and R$_2$ is an alkyl group, a hydroxyalkyl group, or an alkoxyalkyl group.

3. An aqueous ink as claimed in claim 1, wherein R$_1$ and R$_2$ are an alkyl group.

4. An aqueous ink as claimed in claim 1, wherein R$_1$ and R$_2$ are a hydroxyalkyl group.

5. An aqueous ink as claimed in claim 1, wherein R$_1$ and R$_2$ are an alkoxyalkyl group.

6. An aqueous ink as claimed in claim 1, wherein said compound represented by Formula (I) is contained within said ink in an amount of 1 to 30 parts by weight.

7. An aqueous ink as claimed in claim 6, wherein said compound represented by Formula (I) is contained within said ink in an amount of from about 3 to 25 parts by weight.

* * * * *